ACTUATING MECHANISM FOR MAGNETIC INSTRUMENT MOVABLE ELEMENTS

Filed Nov. 9, 1950 2 Sheets-Sheet 1

Edmund Barany
Melvin Sackter
INVENTORS.
BY [signature]
ATTORNEYS

Edmund Barany
Melvin Sackter
INVENTORS
BY
ATTORNEYS

Patented Aug. 31, 1954 2,687,881

UNITED STATES PATENT OFFICE 2,687,881

ACTUATING MECHANISM FOR MAGNETIC INSTRUMENT MOVABLE ELEMENTS

Edmund Barany, Chicago, and Melvin Sackter, Arlington Heights, Ill., assignors to Ampro Corporation, Chicago, Ill., a corporation of Illinois Application November 9, 1950, Serial No. 194,915

3 Claims. (Cl. 271—2.3)

The present invention relates to means for moving the elements of magnetic recording and/or reproducing instruments that cooperate with such devices of the instruments such as erasing assemblies, magnetic heads and record-driving capstan-rolls, by exerting pressure against them. Elements of the kind in question are pressure pads for pressing record bodies against contact surfaces of the devices, auxiliary magnetic shields that cooperate with head-shielding cans to form magnetic circuits that shield windows in the cans, and pinch rolls for pressing record bodies against capstan rollers to cause driving of the record bodies. For threading, such elements desirably are movable between advanced positions wherein they are urged to exert pressure against the devices with which they cooperate, and retracted positions spaced away from such devices. Advantageously all such elements are moved between their two positions by a single movement of a common operator element, and to insure proper correlation of the positions of the element with drive or non-drive of the record body, the common operator preferably is the operator of the switch that controls motor operation. One aspect of the invention relates to a mechanism for actuating from a switch operator a system of supporting and positioning members that individually support such elements. A second aspect relates to provision of a pinch roll supporting bracket and an operating device for swinging it to move a pinch roll that it supports between advanced and retracted positions. This operating device is arranged for operation by the actuating member referred to above.

A primary object of the invention is the provision of a novel actuating member for moving between advanced and retracted positions all of plural elements that cooperate with various devices of a magnetic recording and/or reproducing instrument by exerting pressure against them while in their advanced positions.

Another object is the provision of a novel system for positively positioning such a member selectively in a preselected definite position or in a second position wherein respectively it properly positions all of the plural elements in their advanced and retracted positions.

Another object is the provision of a novel system for moving such an actuating member to and from its preselected, definite position, operation of which system is controlled by movement of a motor-controlling switch operator between definite positions predetermined by the arrangement of the switch that is operated by the operator.

Still another object is the provision of a novel pinch roll-supporting bracket.

An additional object is the provision of a novel actuating connection between an actuating member of the arrangement referred to above, and a pinch roll-supporting bracket, for swinging the bracket to move a pinch roll thereby supported between advanced and retracted positions as the actuating member is moved between its two positions.

Still another object is to provide a novel arrangement of a pinch roll bracket and actuating member system for urging a pinch roll supported by the bracket to exert pressure against a capstan roller while the bracket and pinch rolls are in advanced positions.

Figure 1:
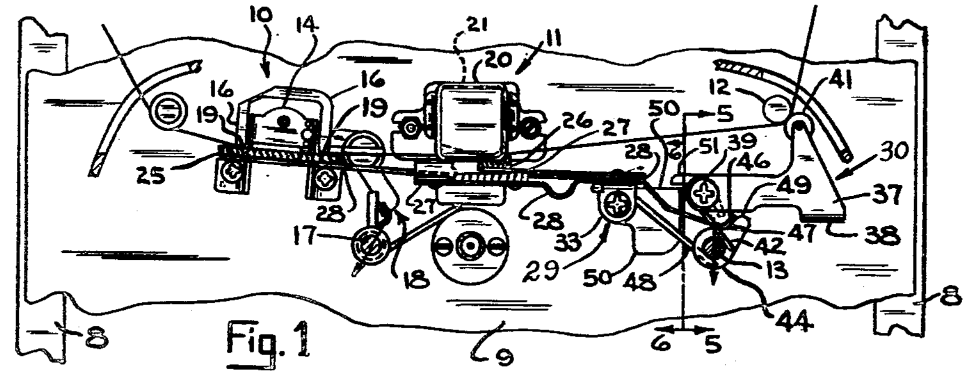
Fig. 1 is a fragmentary top plan of a magnetic recording and reproducing instrument showing the mechanism, devices and elements of the instrument that cooperate with a record body, showing the instrument in record body-driving condition.
Figure 3:
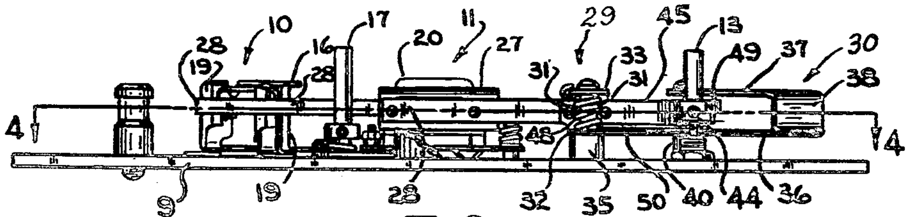
Fig. 3 is a front elevation of the arrangement of Fig. 1.

The instrument shown comprises casing structure 8 enclosing a motor and electronic apparatus and having a cover plate 9. Devices of the instrument that are cooperative with an elongate magnetizable record body are, in successive spaced order in the direction of record body travel, an erasing assembly 10, a magnetic recording and reproducing head 11 and a capstan roller 12 that is driven by a motor controlled by a switch that is operated by a shaft 13. The shaft 13 is movable between two predetermined positions, an "on" position effective to maintain the motor in operation and an "off" position effective to maintain the motor stopped.

The erasing assembly shown is fully described and claimed in applications for United States Patent, Serial No. 194,917, filed November 9, 1950, by Edmund Barany, Harold W. Bauman and Melvin Sackter, and Serial No. 194,916, filed November 9, 1950 now Patent No. 2,617,890, by Edmund Barany and Melvin Sackter. In brief it comprises a bracket 14 supporting a permanent magnet 15, and a device 16 movable by a selector shaft 17 through linkage 18 and providing record body-guiding surfaces 19 that are movable between retracted and advanced positions, respectively permitting a record body to contact guide surfaces arranged in a region of erasing effectiveness, and to space a record body beyond such region.

The head 11 includes a can shield 20 surrounding a recording and pickup head assembly 21, and having a window 22 that permits lateral movement of a record body into contact with a guide surface 23 of the head assembly.

For pressing a record body against the erasing guide surfaces or surfaces 19, depending on the position of device 16, a pressure pad 25 is provided. A pressure pad 26 is provided to press the record body against the head guide surface 23. Cooperative with head shield can 20 is an auxiliary shield 27, fully disclosed and claimed in application for United States patent, Serial No. 194,823, filed November 9, 1950, by Manuel L. Flata. The pressure pads 25, 26 and auxiliary shield 27 are mounted by resilient strips 28 to an actuating member 29 as disclosed and claimed by application for United States patent, Serial No. 194,914, filed November 9, 1950, by Harold W. Bauman. The actuating member 29, means for operating it by movement of switch shaft 13 between its two positions, a pinch roll supporting bracket 30 and means for actuating the latter by operation of actuating member 29, comprise the present invention. Application for United States patent, Serial No. 194,918, filed November 9, 1950, by Edmund Barany, Harold W. Bauman and Melvin Sackter claims combinations of the element suspension system of application Serial No. 194,914 and the present invention.

Now referring to the present invention, the actuating member 29 is pivotally mounted on a stud shaft 31 projecting from cover plate 9, and comprises a U-shaped member having an inner arm 32, an outer arm 33 and a cross reach 34 that connects the arms. The outer surface of cross reach 34 affords a mounting for the resilient strips 28. The arms 32, 33 rotatably surround shaft 31 and a collar 35 spaces the actuating member from cover plate 9.

The pinch roll-supporting bracket 30 comprises inner and outer substantially L-shaped arms 36, 37 connected by a cross reach 38. Bracket 30 is pivotally supported on a stud shaft 39 that is rotatably surrounded by arms 36, 37 and mounted in cover plate 9. A collar 40 spaces bracket 30 from cover plate 9. A pinch roll 41 is rotatably mounted between the ends of arms 36, 37 for swinging by pivotal movement of the plate between the advanced position of Figs. 1 and 4 and the retracted position of Fig. 2. A spring 42 has one end hooked over an edge of lower bracket arm 36, a central part coiled around shaft 39 and a second end bearing on switch shaft 13, biasing bracket 30, counterclockwise as seen in Figs. 1, 2 and 4, toward advanced positions of the bracket and pinch roll, and in such positions urging the pinch roll to exert pressure against capstan roller 12.

Figure 4:
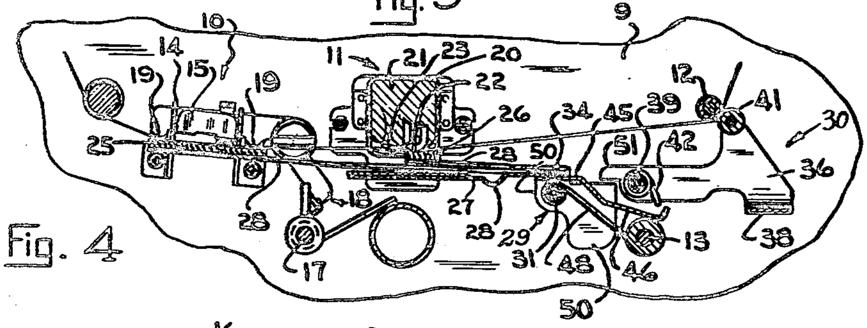
Fig. 4 is a fragmentary horizontal section on line 4—4 of Fig. 2.
Figure 2:
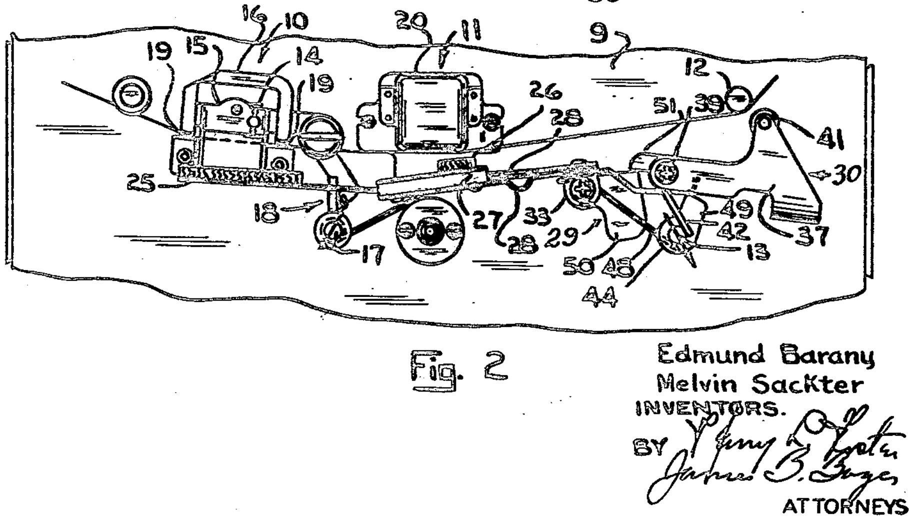
Fig. 2 is a similar view showing the instrument in stopped condition.
Figure 5:
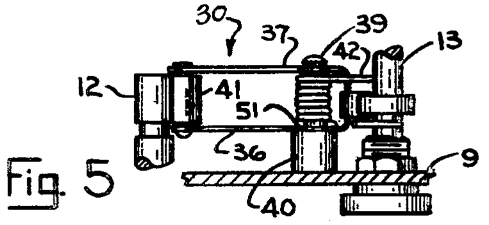
Fig. 5 is a transverse vertical section on line 5—5 of Fig. 1.

Actuating member 29 is movable to and from a first preselected, definite position corresponding to the "on" position of switch shaft 13, also corresponding to the advanced positions of elements 25, 26, 27 and 41, and shown in Figs. 1 and 4. It also has a second position, shown in Fig. 2, corresponding to the "off" position of shaft 13 and the retracted positions of the elements. The first position is definitely fixed and preselected by cooperation between an actuating cam 44 mounted on shaft 13 and an actuated lever 45 that is secured to the inner surface of the actuating member cross reach 34 and projects into cooperating contact with cam 44. Lever 45 has a recurved end portion 46 that enters a notch or dwell 47 when shaft 13 is in "on" position and the angular position of lever 45, as determined by dwell 47, fixes the actuating member position corresponding to the shaft "on" position. A bias spring 48 has an end hooked over lower actuating member arm 33, an intermediate part coiled about stub shaft 30 and an end bearing against switch shaft 13, biasing actuating member, clockwise as seen in Figs. 1, 2 and 4, toward its preselected position corresponding to the "on" position of shaft 13, and maintaining lever 45 in contact with the contoured surface of cam 44. The strip members 28 have longitudinal configurations to maintain the elements that they support in proper pressure-exerting relations to opposed surfaces of devices 10 and 11 when member 29 is in this position. Cam 44 has an arm 49 that moves lever 45 and actuating member 29 counterclockwise as switch shaft 13 is rotated counterclockwise to its "off" position.

For correlating the positions of bracket 30, and consequently that of pinch roll 41, with the positions of switch shaft 13, actuating member 29 is arranged to move bracket 30 and pinch roll 41 to retracted positions, against the urge of bracket-biasing spring 42, when the actuating member is moved from its preselected position corresponding to the "on" switch shaft position and against the urge of its own biasing spring 48. To this end the lower arm 32 of the actuating member has an extension 50 that extends toward bracket 30 and that lies clockwise of a nosepiece 51 projecting from the lower bracket arm 36. As seen from Figs. 1 and 2, when actuating member 30 is swung counterclockwise from its Fig. 1 position corresponding to the "on" position of switch shaft 13, it contacts nosepiece 51 and swings the bracket clockwise to retract pinch roll 41 from contact with capstan roller 12. It will be seen from Fig. 1 that when bracket 31 is in its advanced position and member 30 is in its corresponding, preselected, definite position, nosepiece 51 is slightly spaced from contact with extension 50, so that contact and exertion of pressure by pinch roll 41 against capstan roller 12 under the urge of bias spring 42 is not interfered with by extension 50.

Figure 7:
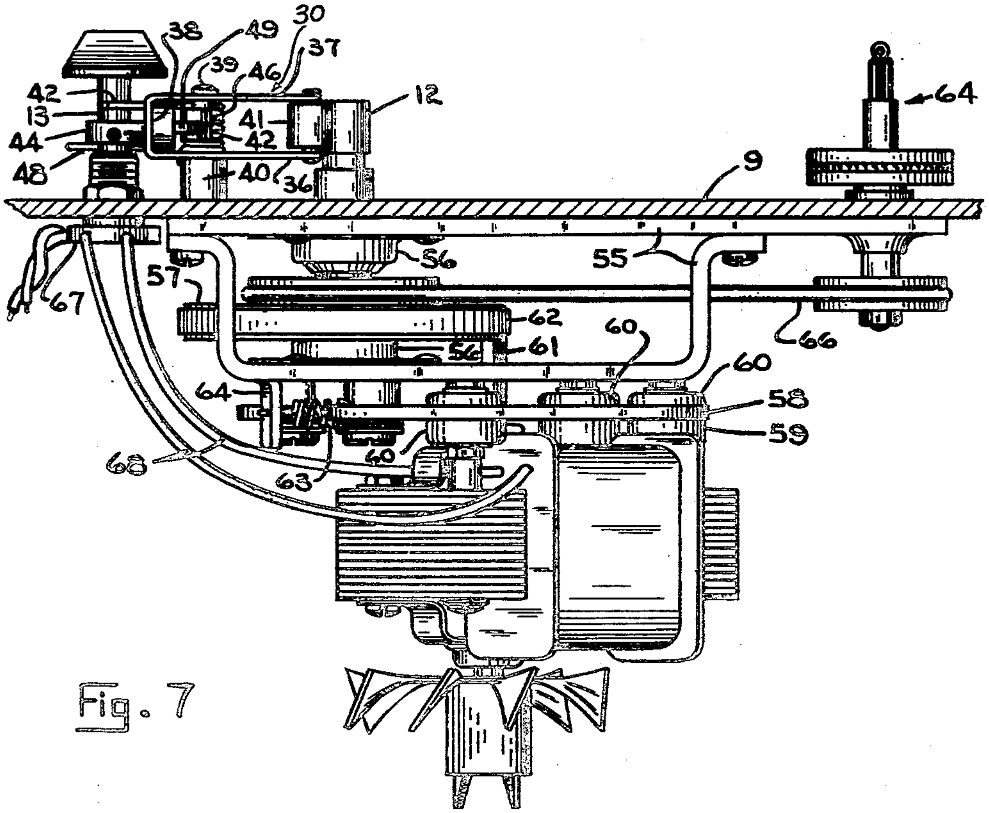
Fig. 7 is a partial section through a magnetic recording and reproducing instrument showing in elevation a motor and drive assembly and the switch controlling the motor.
Figure 6:
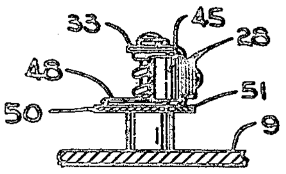
Fig. 6 is a transverse vertical section on line 6—6 of Fig. 1.

The driving assembly shown in Fig. 7 is fully disclosed and claimed in the application for United States patent, Serial No. 196,134, filed November 9, 1950, now Patent No. 2,585,724, by Edmund Barany and Melvin Sackter. In brief it comprises a supporting structure of upper and lower plates 55 that are mounted on the underside of instrument cover plate 9, and that support in bearings 56 a rotatable unit including capstan roller 12 and a flywheel 57. Suspended from the underside of the lower plate 55, for pivoted movement about an axis laterally spaced from and parallel to the axis of rotation of unit 12, is a motor supporting plate 58. A motor 59 is supported on plate 58 by resilient grommets 60. Motor 59 has a rotating spindle 61 that contacts the resiliently tired periphery 62 of flywheel 57, to drive the latter and capstan roller 12 when motor 59 is running. A spring 63 is connected to a tongue 64 struck from lower support plate 55, and motor plate 58, and biases the latter and motor 59 about the pivot axis to maintain spindle 61 in driving contact with the flywheel. A take-up spindle assembly 64 is mounted in a bearing 65 supported by upper support plate 55, and is driven from unit 12, 57 by a belt 66.

A motor switch 67 is mounted under cover plate 9 and controls energization of motor 59 by connection and disconnection of motor lines 68 to and from power lines 69. Switch 67 is operated by shaft 13.

From the foregoing it will be seen that many arrangements other than those disclosed may be made for practicing the invention, and it is to be understood that the scope of the invention is determined solely by the claims.

We claim:

1. In a magnetic transducing instrument that includes a capstan for driving along a travel path an elongate magnetizable record body that is pressed against its periphery, mechanism for rotating said capstan, and an operation-selective shaft that is rotatable between first and second predetermined angularly spaced positions wherein respectively it is effective to maintain said capstan in rotation and stopped; a mechanical system for supporting a pinch roll, maintaining it in pressure-exerting relation to said capstan periphery while said shaft is in its said first position and maintaining it spaced therefrom while said shaft is in its said second position, said system comprising a bracket positioned to the opposite side of the travel path from said capstan and supporting said pinch roll, means pivotally mounting said bracket with the axis of said pinch roll parallel to the axis of rotation of said capstan and for swinging of said pinch roll about a pivot axis disposed parallel to the other said axes, and positioning said pinch roll for movement by swinging of said bracket between first and second positions toward and away from contact with said capstan periphery, a bias spring effective between a fixed part of said instrument and said bracket to continuously urge the latter to its first position and to urge said pinch roll against the capstan periphery while said bracket is in its said first position, an actuator member pivotally mounted adjacent said bracket for swinging between a first and a second position, an extension of said actuator member angularly disposed for occupying a position spaced from said bracket while said actuator member and said bracket both are in their said first positions and during movement of said actuator device from its first to its second position to contact said bracket and move it from its first to its second position, and mechanism actuated by rotation of said shaft to move said actuator from its first to its second position.

2. In a magnetic transducing instrument that includes a capstan for driving along a travel path an elongate magnetizable record body that is pressed against its periphery, mechanism for rotating said capstan, and an operation-selective shaft that is rotatable between first and second predetermined angularly spaced positions wherein respectively it is effective to maintain said capstan in rotation and stopped; a mechanical system in accordance with claim 8, including a second bias spring continuously urging said actuator member toward its said first position, and wherein said mechanism includes a cam that is rotatable by rotation of said shaft, and a follower connected with said actuator member and actuated by rotation of said cam during rotation of said shaft from its first to its second position to swing said actuator member from its first to its second position.

3. In a magnetic transducing instrument that includes a capstan for driving along a travel path a magnetizable record body pressed against its periphery, mechanism for rotating said capstan, and a control device that is movable between first and second positional conditions wherein respectively it is effective to maintain said capstan in rotation and stopped; a mechanical system for supporting a pinch roll, maintaining it in pressure-exerting relation to said capstan periphery while said control device is in its said first positional condition and maintaining it spaced from sad periphery while said divice is in its second positional condition, said system comprising a bracket structure for swnging about a fixed pivot axis disposed parallel to the axis of rotation of said capstan, said bracket structure having a pair of arms extended in different directions from said pivot axis and said pinch roll being supported on one of said arms with its axis parallel to the other said axes and for swinging to and from contact with said capstan periphery, a bias spring continuously urging said bracket to press said pinch roll against said capstan periphery, an actuator member pivotally mounted for swinging about a fixed pivot axis parallel to the other said axes, means limiting swinging of said actuator in a first direction to a preselected angular position, an extension projecting from said actuator member in angular disposition to clear the second arm of the second of said bracket structure lever arms while said actuator member is in its said preselected position and said bracket structure is positioned with said pinch roll in pressure-exerting relation to said capstan periphery, and to contact and move said second lever arm to swing said pinch roll away from said capstan periphery during swinging of said actuator member in the second of its directions away from its said preselected position, a second bias spring continuously urging said actuator member to its first position, a selector shaft rotatable about an axis parallel to the other said axes between angularly spaced first and second positions wherein respectively it is effecive to maintain said control device in its first and second positional conditions, a cam rotatable by rotation of said shaft, and a follower lever projecting from said actuator, biased into contact with said cam by said second bias spring and in angular disposition to swing said actuator member from its said first to its said second preselected position by rotation of said cam during rotation of said shaft from its first to its second said position.

References Cited in the file of this patent

UNITED STATES PATENTS

| Number | Name | Date |
|---|---|---|
| 1,821,899 | Schneider | Sept. 1, 1931 |
| 2,008,097 | Cook | July 16, 1935 |
| 2,221,661 | Woolf | Nov. 12, 1940 |
| 2,451,833 | Koch | Oct. 19, 1948 |
| 2,467,507 | Stone | Apr. 19, 1949 |
| 2,538,893 | Begun | Jan. 23, 1951 |

FOREIGN PATENTS

| Number | Country | Date |
|---|---|---|
| 869,928 | French | Feb. 1942 |